US009154186B2

(12) United States Patent
Nishisaka et al.

(10) Patent No.: US 9,154,186 B2
(45) Date of Patent: Oct. 6, 2015

(54) TOOLSTRING COMMUNICATION IN CABLE TELEMETRY

(71) Applicant: Schlumberger Technology Corporation, Sugar Land, TX (US)

(72) Inventors: Hiromasa Nishisaka, Sagahimara (JP); Takeaki Nakayama, Machida (JP); Milos Milosevic, Houston, TX (US); Eric Jeanson, Sugar Land, TX (US); Nalin Weerasinghe, Sagamihara (JP); Kun Wang, Sugar Land, TX (US); Yuichi Kobayashi, Machida (JP); Motohiro Nakanouchi, Hachioji (JP); David Santoso, Sugar Land, TX (US); Alex Olson, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 245 days.

(21) Appl. No.: 13/705,137

(22) Filed: Dec. 4, 2012

(65) Prior Publication Data

US 2014/0152457 A1 Jun. 5, 2014

(51) Int. Cl.
*G01V 3/00* (2006.01)
*H04B 3/02* (2006.01)
*H04B 3/46* (2015.01)
*E21B 47/12* (2012.01)

(52) U.S. Cl.
CPC *H04B 3/02* (2013.01); *E21B 47/12* (2013.01); *H04B 3/46* (2013.01)

(58) Field of Classification Search
CPC .......................................................... H04B 3/02

USPC ............................................. 340/853.1, 853.2
See application file for complete search history.

(56) References Cited

U.S. PATENT DOCUMENTS

| 4,597,073 | A | 6/1986 | Staples |
| 4,905,234 | A | 2/1990 | Childress et al. |
| 5,191,326 | A | 3/1993 | Montgomery |
| 5,331,318 | A | 7/1994 | Montgomery |
| 5,592,438 | A | 1/1997 | Rorden et al. |
| 5,719,883 | A | 2/1998 | Ayanoglu |
| 5,784,004 | A | 7/1998 | Esfahani et al. |
| 5,838,727 | A | 11/1998 | Lyon et al. |

(Continued)

FOREIGN PATENT DOCUMENTS

| GB | 2393364 | 3/2004 |
| GB | 2408432 | 5/2005 |

(Continued)

*Primary Examiner* — Amine Benlagsir
(74) *Attorney, Agent, or Firm* — Daryl R. Wright; Jody DeStefanis

(57) ABSTRACT

Systems and methods for toolstring communication in cable telemetry. The methods involve positioning a cable telemetry system in a wellbore. The cable telemetry system can include a surface modem, a downhole toolstring of downhole tools, a downhole modem operatively coupled to the downhole toolstring, a cable operatively coupling between the surface modem and the downhole modem, and a surface data routing module that polls and trains the cable telemetry system. The methods also involve performing a pre-transmission poll of a rate requirement for the downhole toolstring and a telemetry type for the downhole modem, applying a training phase to establish a transmission link between the surface modem and the downhole modem, configuring data obtained by the downhole toolstring for an uplink via the transmission link, and transmitting the uplink via the transmission link.

10 Claims, 12 Drawing Sheets

(56) References Cited

U.S. PATENT DOCUMENTS

| | | | |
|---|---|---|---|
| 5,995,449 A | 11/1999 | Green et al. | |
| 6,061,633 A | 5/2000 | Fukuhara et al. | |
| 6,175,599 B1 | 1/2001 | Lyon et al. | |
| 6,252,518 B1 | 6/2001 | Laborde | |
| 6,310,559 B1 | 10/2001 | Laborde et al. | |
| 6,519,568 B1 | 2/2003 | Harvey et al. | |
| 6,552,665 B1 | 4/2003 | Miyamae et al. | |
| 6,580,751 B1 | 6/2003 | Gardner et al. | |
| 6,628,992 B2 | 9/2003 | Osburn, III | |
| 6,657,551 B2 | 12/2003 | Huckaba et al. | |
| 6,747,569 B2 | 6/2004 | Hill et al. | |
| 6,999,517 B1 | 2/2006 | Bombay et al. | |
| 7,026,952 B2 | 4/2006 | Krueger | |
| 7,042,367 B2 | 5/2006 | Gardner et al. | |
| 7,081,831 B2 | 7/2006 | Dodge | |
| 7,096,961 B2 | 8/2006 | Clark et al. | |
| 7,132,958 B2 | 11/2006 | Dodge et al. | |
| 7,181,515 B2 | 2/2007 | Lin et al. | |
| 7,193,525 B2 | 3/2007 | Miyamae et al. | |
| 7,394,752 B2 | 7/2008 | Hasegawa et al. | |
| 7,443,312 B2 | 10/2008 | Quintero et al. | |
| 7,480,207 B2 | 1/2009 | Marsh | |
| 7,787,525 B1 | 8/2010 | Clark, Jr. et al. | |
| 8,217,802 B2 | 7/2012 | Weerasinghe | |
| 2002/0178295 A1 | 11/2002 | Buczek et al. | |
| 2003/0163822 A1* | 8/2003 | Knutson et al. | 725/68 |
| 2004/0155794 A1 | 8/2004 | Gardner | |
| 2004/0156264 A1 | 8/2004 | Gardner et al. | |
| 2004/0203416 A1* | 10/2004 | Hata et al. | 455/67.7 |
| 2005/0013353 A1* | 1/2005 | Alloin | 375/222 |
| 2005/0046592 A1 | 3/2005 | Cooper et al. | |
| 2005/0141480 A1* | 6/2005 | Jin et al. | 370/351 |
| 2005/0182870 A1* | 8/2005 | Steiner et al. | 710/60 |
| 2009/0225656 A1* | 9/2009 | Takagi et al. | 370/235 |
| 2010/0194586 A1* | 8/2010 | Tjhang et al. | 340/854.7 |
| 2010/0278530 A1* | 11/2010 | Kummetz et al. | 398/41 |
| 2010/0295702 A1 | 11/2010 | Zhao et al. | |
| 2010/0304688 A1* | 12/2010 | Knudsen et al. | 455/68 |
| 2010/0327154 A1* | 12/2010 | Vaeth et al. | 250/269.6 |
| 2011/0005835 A1 | 1/2011 | Li | |
| 2011/0135308 A1* | 6/2011 | Tarlazzi et al. | 398/79 |
| 2011/0218006 A1* | 9/2011 | Hanaki et al. | 455/509 |
| 2012/0314570 A1* | 12/2012 | Forenza et al. | 370/230 |
| 2013/0176841 A1* | 7/2013 | Cao et al. | 370/210 |
| 2013/0341090 A1* | 12/2013 | Zeineddine et al. | 175/24 |
| 2014/0152460 A1 | 6/2014 | Santoso et al. | |

FOREIGN PATENT DOCUMENTS

| | | |
|---|---|---|
| WO | 0195517 | 12/2001 |
| WO | 2008005054 | 1/2008 |

* cited by examiner

TOOLSTRING COMMUNICATION IN CABLE TELEMETRY

BACKGROUND

The following descriptions and examples are not admitted to be prior art by virtue of their inclusion in this section.

Hydrocarbon fluids, such as oil and natural gas, may be obtained from a subterranean geologic formation, referred to as a reservoir, by drilling a well that penetrates a hydrocarbon-bearing formation. A variety of downhole tools may be used in various areas of oil and natural gas services. In some cases, downhole tools may be used in a well for surveying, drilling, and production of hydrocarbons. The downhole tools may communicate with the surface via various telemetry systems. In some cases, the downhole tools may include one or more individual modules in operative communication with one another, such as a master module and multiple slave modules. Examples of communication systems are provided in U.S. Pat. Nos. 6,628,992, 7,181,515, and Application No. 20020178295.

With the increased precision of downhole tools and sensors, relatively shorter time may be available to send increasingly larger amounts of data. In addition to new modules and assemblies being developed for downhole use on a continuing basis, tool bus systems may facilitate communication between older and newer generation modules in order to obtain the maximum service life from existing modules.

Applications of disclosed embodiments of the present disclosure are not limited to these illustrated examples, different industrial applications may benefit from implementations of the following disclosure.

SUMMARY

In at least one aspect, the disclosure relates to a system for toolstring communication in cable telemetry. The system can include a surface modem. The system can include a downhole toolstring including one or more downhole tools. The system can include a downhole modem operatively coupled to the downhole toolstring, a cable operatively coupling the surface modem and the downhole modem, and a surface data routing module, that upon the system being powered, performs a pre-transmission poll of a rate requirement for the downhole toolstring and a telemetry type for the downhole modem.

In at least another aspect, the disclosure relates to a method for toolstring communication in cable telemetry. The method involves positioning the cable telemetry system in a wellbore. The method also involves performing the pre-transmission poll of a rate requirement for the downhole toolstring and a telemetry type for the downhole modem, applying a training phase to establish a transmission link between the surface modem and the downhole modem, configuring data obtained by the downhole toolstring for an uplink via the transmission link, and transmitting the uplink via the transmission link.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Embodiments of systems, apparatuses, and methods for toolstring polling and training in cable telemetry are described with reference to the following figures. Like numbers are used throughout the figures to reference like features and components.

DETAILED DESCRIPTION

In the following description, numerous details are set forth to provide an understanding of the present disclosure. However, it will be understood by those skilled in the art that the present disclosure may be practiced without these details and that numerous variations or modifications from the described embodiments are possible.

The disclosure relates to cable telemetry for communication of data from downhole tools and the sending of data to downhole tools. Cable telemetry refers generally to communications via a wireline cable, for example, between an uphole (or surface) location and a downhole location. The commands may be sent, for example, via a wireline heptacable between an uphole modem and a downhole modem.

The systems, apparatuses, and methods disclosed herein may be used to enable verification of delivery of data in both directions. The verified delivery may be accomplished, for example by: 1) prior to starting transmission, determining data rate requirements and telemetry type to ascertain that an actual data rate is supported by hardware in use, thereby allowing a user an opportunity to reduce a data rate requirement to a level supported by the hardware, and 2) handshake and buffering mechanisms at various nodes within the cable telemetry system to verify a recipient of uplink or downlink data has capacity to receive a message prior to the message being sent.

"Uplink" may be used to generally refer to any communication transferring data from a downhole tool to the surface, while "downlink" may be used to generally refer to any communication of a command or data from the surface to one or more downhole tools. Communication between downhole tools is termed "inter-tool" communication herein and includes communication between downhole tools without traveling to and from a surface module as done previously.

Toolstring Training Overview

Figure 1:
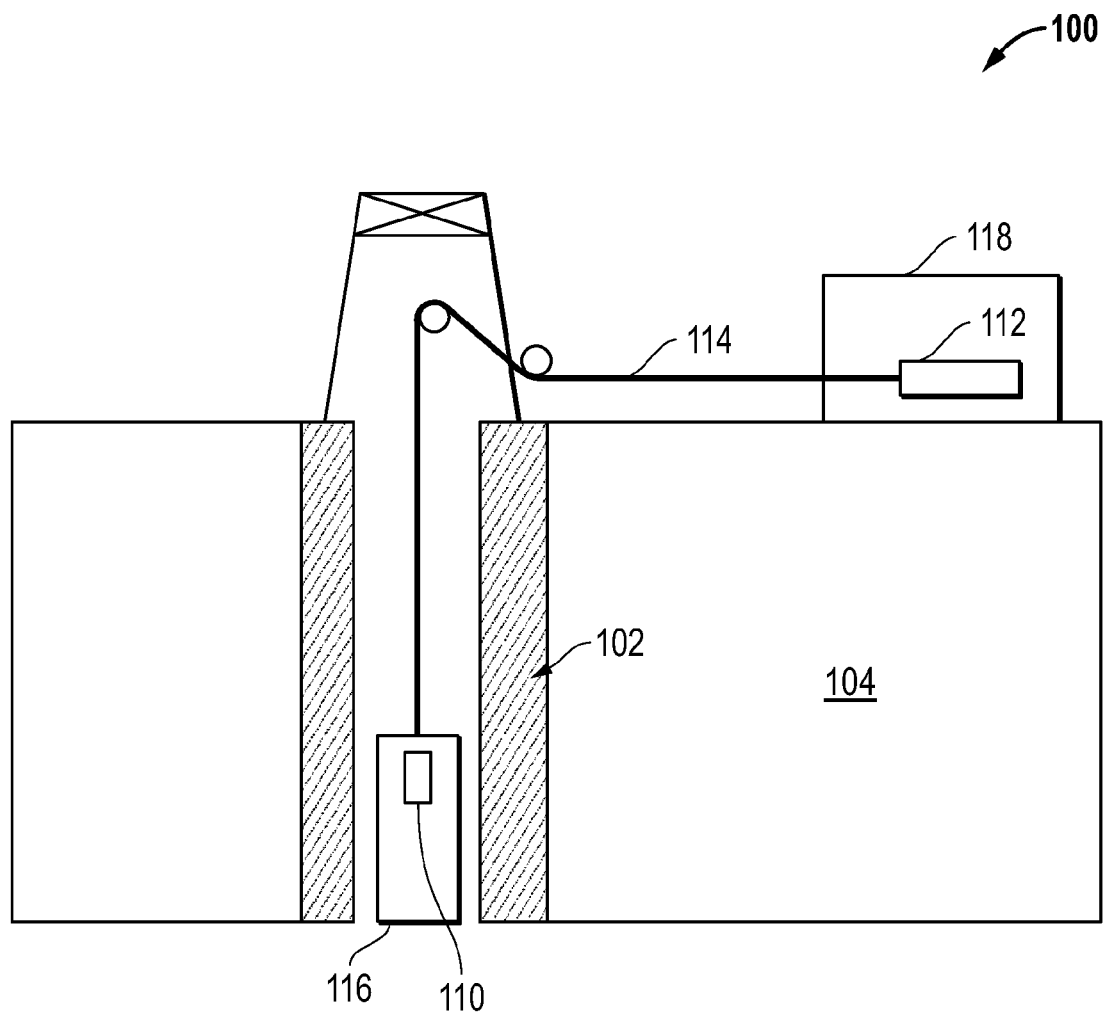
FIG. 1 is a schematic representation of a wellsite system, with a borehole traversing subsurface formations in accordance with an embodiment of the present disclosure.

Referring to FIG. 1, an example wireline logging operation is illustrated with respect to the wellsite system 100 employed in a wellbore 102 traversing a subsurface formation 104. In this embodiment, a downhole telemetry cartridge 110 is connected to a toolstring 116. In a well-logging operation, a plurality of tools (e.g., 230, 230', etc. of FIG. 2) may be connected in the toolstring 116. The tools of the toolstring 116 communicate with the downhole telemetry circuits of downhole telemetry cartridge 110 via a bi-directional electrical interface.

In some embodiment, the tools of the toolstring 116 may be connected to the telemetry cartridge 110 over a common data bus. In some embodiments, each tool of the toolstring 116 may be individually, directly connected to the telemetry cartridge 110. In one embodiment, the telemetry cartridge 110 may be a separate unit, which is mechanically and electrically connected to the tools in the toolstring 116. In one embodiment, the telemetry cartridge 110 may be integrated into a housing of one of the well-logging tools.

The telemetry cartridge 110 is operatively coupled to a wireline cable 114. The tools of the toolstring 116, including the telemetry cartridge 110, may be lowered into the wellbore 102 on the wireline cable 114.

A surface data acquisition computer 118 is located at the surface end of the wireline cable 114. The surface data acquisition computer 118 includes or couples to an uphole telemetry unit 112. The data acquisition computer 118 may provide control of the components in the toolstring 116 and process and store the data acquired downhole. The acquisition computer 118 may communicate with the uphole telemetry unit 112 via a bi-directional electrical interface.

The uphole telemetry unit 112 may modulate downlink commands from the acquisition computer 118 for transmission down the cable 114 to the toolstring 116, and demodulates uplink data from the toolstring 116 for processing and storage by the surface data acquisition computer 118.

The downhole telemetry cartridge 110 contains circuitry to modulate uplink data from the tools of the toolstring 116 for transmission up the wireline cable 114 to the surface data acquisition computer 118 and to demodulate downlink commands from the surface data acquisition computer 118 for the tools of the toolstring 116.

Figure 2:
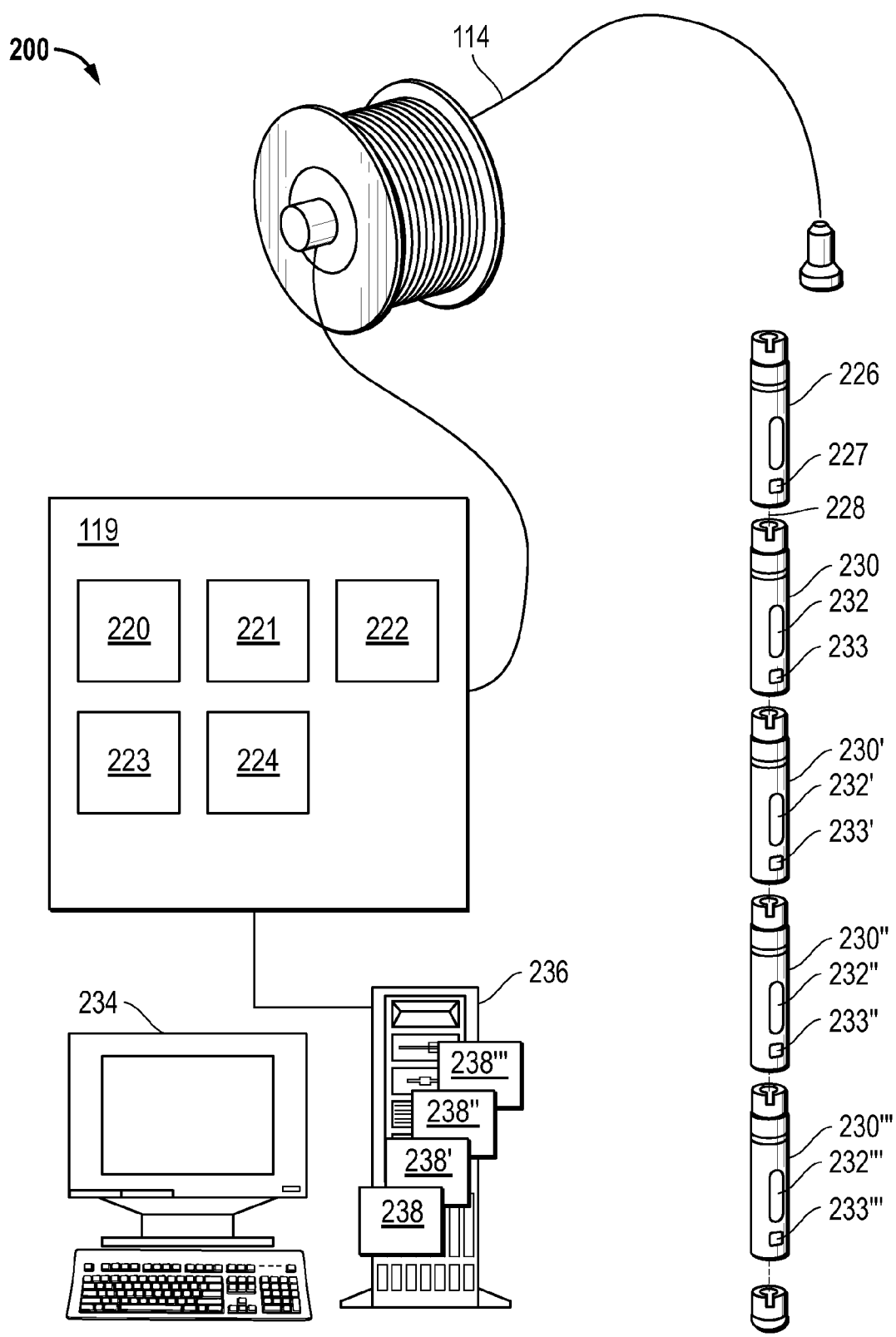
FIG. 2 illustrates schematically an example cable telemetry system for monitoring subterranean formations in accordance with an embodiment of the present disclosure.

A more detailed schematic view of one example cable telemetry system 200 is shown in FIG. 2. The cable telemetry system 200 shown includes a surface acquisition module/surface modem (DTM) 220 having a telemetry interface module (TIM) 222, which can be located at the surface as a portion of or operatively coupled to the surface data acquisition front end 119 (a component of surface data acquisition computer 118 of FIG. 1). The front end 119 may be, for example, eWAFE™ commercially available from SCHLUMBERGER™ (see:www.slb.com).

The surface data acquisition front end 119 is coupled to the wireline cable 114, and a downhole modem (DTC) 226 (as a portion of the downhole telemetry cartridge 110 at the head of a toolstring 116 of FIG. 1). The tool string 116 includes a number of downhole tools, 230, 230', 230", 230''', etc. The downhole tools 230, 230', etc., each containing a respective interface package, 232, 232', 232", 232''', etc., through which they are in communication with the DTC 226 via a tool bus 228. The downhole tools 230, 230', 230", 230''', etc. may also have tool node controllers 233, 233', 233", 233''', etc., respectively.

The cable telemetry system 200 may handle data flows in opposite directions (i.e., from the tools 230, 230', etc.) via the respective interface package 232, 232', etc. and tool bus 228. The flow extends to the DTC 226 to the DTM 220 over the cable 114 ("uplink"), and the reverse direction from the DTM 220 to the DTC 226 and tools 230, 230', etc., over the same path ("downlink"). The cable telemetry system 200 provides a communication path from the tools, 230, 230', etc., to the DTM 220 of the data acquisition computer 118 so that data acquired by the tools, 230, 230', etc., can be processed and analyzed at the surface, as well as communication between tools 230, 230', etc.

Each individual tool (230, 230', etc.) may include a node command buffer (not shown) at the interface package 232, 232', etc., as well as a logic controller of its own (not shown). The surface acquisition front-end unit 119 may also include various additional components, such as power module 221, depth and tension module 223, flow controller software module (FEPC) 224.

The downhole telemetry cartridge 226 can include a downhole master node controller 227 that may examine packets sent by each respective tool 230, 230', etc. Data communicated in either direction may be copied and buffered at the master node controller 227, and sent to the recipient.

The achievable data rate for the downhole cable telemetry system 200 may be a limiting factor in telemetry communications across a wireline, such as cable 114. The data rate generally achievable on the toolbus and in the surface hardware may exceed the data rate achievable over the cable itself.

To avoid data overflow, the cable telemetry system 200 may determine in a pre-transmission poll the toolstring data rate requirements and telemetry type configuration, and perform a training phase to determine actual uplink cable telemetry rate. If the data rate requirements exceed the actual telemetry rate, the cable telemetry link may not be established. The cable telemetry system 200 may also advise the user to reduce a factor affecting the data rate requirement, such as logging speed, or selected mode of operation of the downhole tools (e.g., 230, 230', etc.). By iteration on the data rate requirement, the toolbus 228 access times for different tools 230, 230', etc. may be determined based on the achieved uplink cable telemetry rate and the requirements of the tools 230, 230', etc., given the logging speed and selected mode of operation. Additional details on the pre-transmission poll and training phase are described in further detail herein.

In the pre-transmission poll, the surface computer data dispatcher module 236 (which may, in an embodiment, be SCHLUMBERGER™ MAXWELL™ framework commercially available from SCHLUMBERGER™ (see: www.slb.com)) of a surface computer 234 may be used to determine the data rate requirement by polling various surface tool applications 238, 238', 238", 238''', etc. of the surface computer data dispatcher module 236 for individual requirements.

In the pre-transmission poll, the surface computer data dispatcher module 236 collects the required data rate requirements from each tool application in toolstring 116. The sizes of messages, packets, superpackets, and cable link packets, as well as the frequency of each type of packet, may be for example, stored in a database operatively available to the surface computer data dispatcher module 236, or entered manually. The surface computer data dispatcher module 236 may determine the telemetry type based on the downhole telemetry cartridge 226 in use in the toolstring 116. The data rate requirements and telemetry type may be passed to the surface acquisition front-end unit 119. The flow controller software module 224 of the surface acquisition front-end unit 119 boots and initializes the DTM 220 for a given telemetry service.

The telemetry type configuration data may include some or all of the following: link information, which may include, for example, the number of messages of each tool application by type such as Distributed Tool Bus (DTB), Fast Tool Bus (FTB) and Enhanced Fast Tool Bus (EFTB); cable information, which may include, for example, data related to cable information like length and type; control block information, which may include, for example, information relating to data handling for each application in flow controller software module 224; DTA/EDTA information, which may include, for example, an adapter ID, and the like; tool module information, which may include, for example, information, such as receiver gain for the flow controller software module 224 and the telemetry interface module 222 on the telemetry system; cartridge information, which may include, for example, parameters used in the process of the measurement data by telemetry cartridge, such as head voltage and downhole force. Also, this data may include gain and offset for each measurement data, respectively; IP information, which may include, for example, tool bus initialization parameters, e.g., window size, delay and operation mode, such as IP, EIP, and EIP 2.0 mode; physical node ID Information, which may include, for example, physical node ID information for the interface package.

The pre-transmission poll can involve polling a surface tool application (e.g., 238, 238', etc.) for each dowhole tool (230, 230', etc.), the surface computer data dispatcher module 236, and surface acquisition front-end unit 119. In an embodiment, the pre-transmission poll starts upon the toolstring 116 being powered up. The tool-string power-up sequence may then be initiated by a user's command.

The surface computer 234 passes a power-up request to the flow controller software module 224 of the DTM 220 by sending a "Start Acquisition". A user may apply power using a power panel on the surface acquisition front end 119. An estimated head voltage measured by cable trim may be displayed on the power panel until telemetry link is established. Upon cartridge powered-up, a telemetry training sequence starts and the estimated head voltage is replaced by the actual measured value reported by the DTC 226. In a situation where the toolstring 116 is powered up and the telemetry link goes down, the DTC 226 may continuously try to connect to the TIM 222 on surface.

The training phase may be used to establish a cable telemetry link and optimize the surface and downhole transceivers for a given cable and given downhole conditions. In an embodiment, the cable training phase starts when DTC 226 is supplied with sufficient power, for example, for a head voltage of greater than about 225 Volts.

The surface computer 234 provides data rate requirements for the configured toolstring 116 to the DTM 220. The data requirements may be compared with an estimated data rate calculated during the training phase. The output from the DTM 220 after the training phase may be contained in performance/state messages.

The cable telemetry training may be regarded to have succeeded if the following occurs: 1) physical layer training sequence completes successfully, and 2) the uplink data rate requirement is achieved with an acceptable signal-to-noise ratio margin. The training sequence may be complete, for example, where there is no lost energy, a bad pilot, or the like. The data rate requirement may be, for example greater than about 6 dB.

Upon a successful training phase, the surface computer 234 may receive a 'Cable Telemetry Link Up' bit set in 'Cable Telemetry Link Status Word', a maximum achievable Up Link Data Rate estimated during training, a total current Up Link Data Rate, and a DTC 226 Head Voltage.

Upon a successful training phase, the surface computer 234 may receive a 'Cable Telemetry Link Down' bit set in 'Cable Telemetry Link Status Word', and a total achievable up link data rate estimated during training. The "Cable Telemetry Link Status Word" is used by the surface computer 234 to help control the 'System Up'/'System Down' status. If the required data rate cannot be reached, the cable telemetry link may not be established and the user may be advised by surface the computer 234 to reduce the data rate requirement. Successful training of cable telemetry may be termed as 'Cable Telemetry Link Established.'

In a given example, the method for uplink may be summarized as follows: The uplink data originates in the individual downhole tools 230, 230', etc., and is then transported via the toolbus 228 to the DTC 226 where the uplink data is prepared for transmission on the cable 114. The DTC 226 modem communicates to the DTM 220 on the surface via the cable 114. The data continues to the flow controller software module 224 where the uplink data may be correlated with the depth at which the data was acquired (based on time stamping and determination by surface acquisition front end 119). The data then proceeds to the surface computer data dispatcher module 236 to be routed to the specific application from among the surface tool applications 238, 238', etc. that is the recipient of the data.

Figure 3:
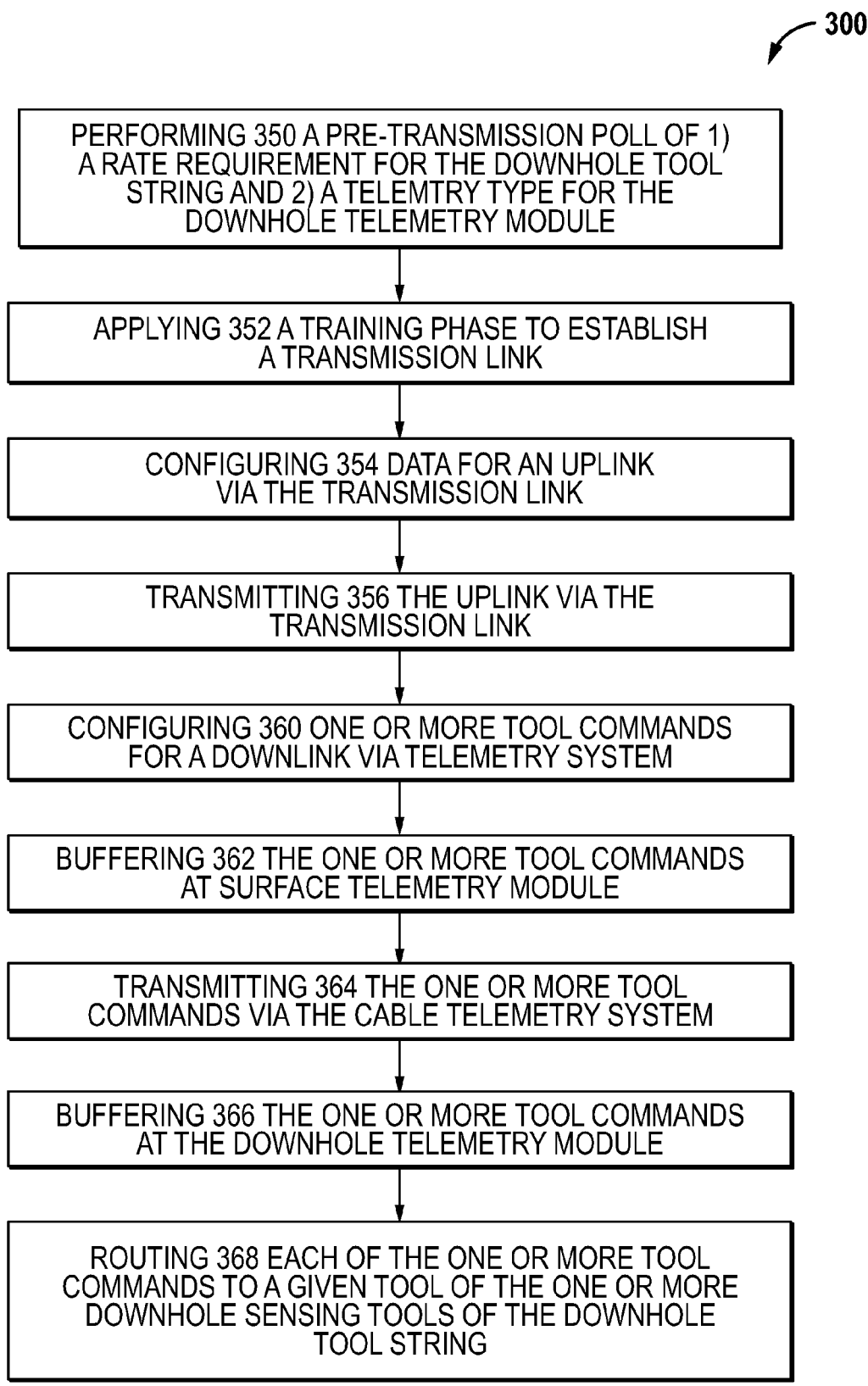
FIG. 3 is a flow chart illustrating a method for communication in a cable telemetry system, such as that described with respect to FIG. 2 in accordance with an embodiment of the present disclosure.

Turning now to FIG. 3, a flow chart of a method 300 for communication in a cable telemetry system, such as that described with respect to FIGS. 1-2, is provided. An uplink portion of the method 300 begins with performing 350 a pre-transmission poll of 1) a rate requirement for the downhole toolstring 116 and 2) a telemetry type for the downhole telemetry module. The method continues with applying 352 a training phase to establish a transmission link. The method continues with configuring 354 data for an uplink via the transmission link. The method continues with transmitting 356 the uplink via the transmission link.

A downlink portion of the method 300 involves configuring 360 one or more tool commands for a downlink via the telemetry system. The commands may be created by surface tool applications 238, 238', etc. and consumed by the tools 230, 230', etc. of FIG. 2. The tool commands may be buffered 362 at the surface telemetry module. The method continues by transmitting 364 the tool commands via the cable telemetry system. The downlink data may be transported using superpackets, which are collections of commands. The delivery of superpackets may be guaranteed by the cable telemetry, based on handshaking mechanisms, buffer flow control, error checking, and re-transmission of superpackets in error.

The method continues with buffering 366 the tool commands at the downhole telemetry module. The commands may be buffered in the master node controller 227 waiting for delivery to the recipient tool when the recipient tool is ready to receive the command. The node specific command flow may be controlled by a handshake between the surface computer 234 and DTC 226 according to the specific tool's command consumption. The method continues with routing 368 each of the one or more tool commands to a given tool of the one or more sensing tools of the downhole toolstring 116.

Figure 4:
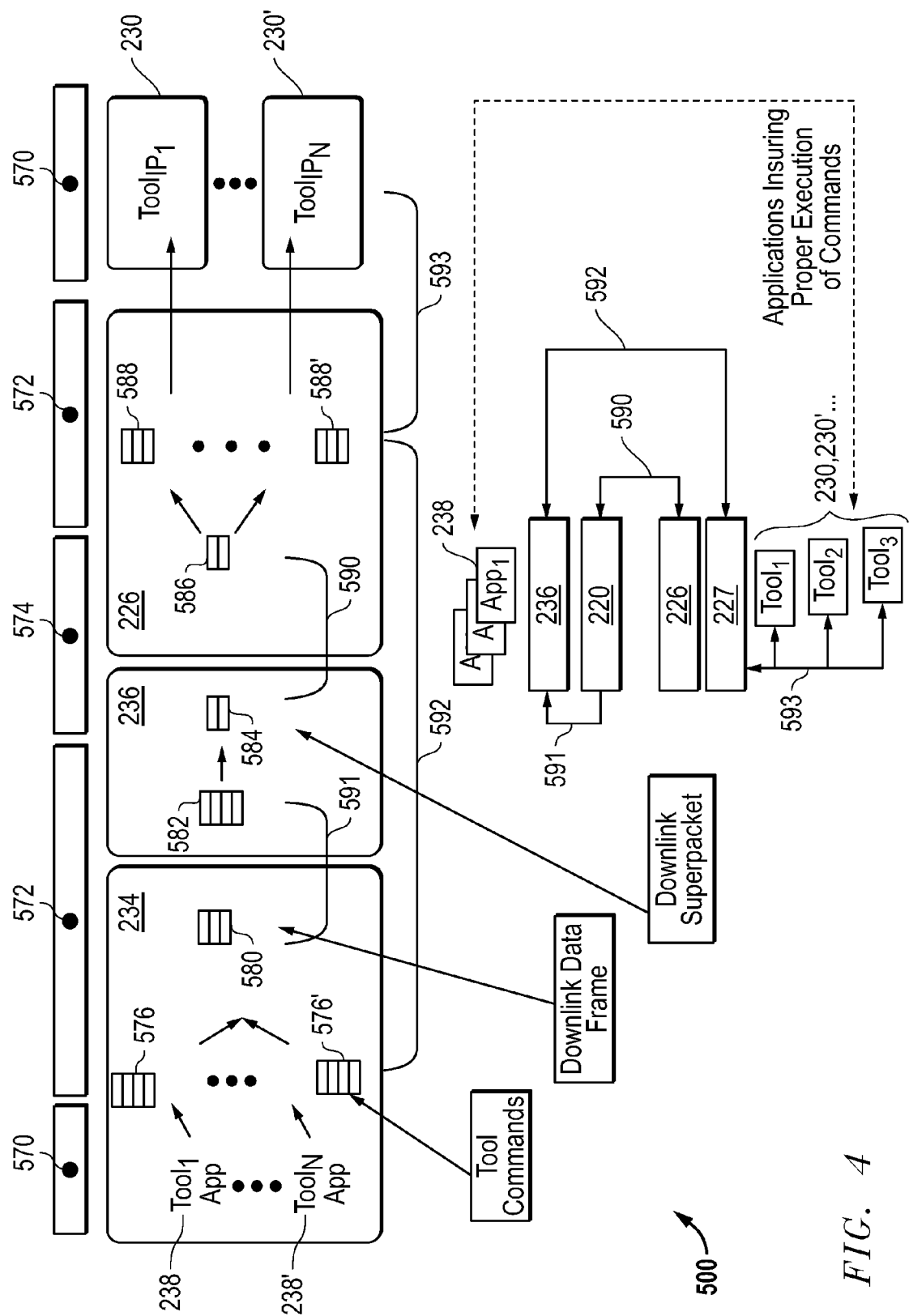
FIG. 4 is a schematic diagram illustrating layers of buffer control implemented in multiple control loops in accordance with an embodiment of the present disclosure.

A buffer control system 500 for the telemetry system 200 is depicted in FIG. 4. The buffer control system 500 may include various buffers managed according to three layers as illustrated in the schematic of FIG. 4. In Layer 570, surface tool applications 238, 238', etc. generate commands. Individual tools 230, 230', etc. consume commands in downlink. Individual tools 230, 230', etc. generate uplink messages and surface tool applications 238, 238', etc. consume messages in uplink.

In Layer 572, surface computer data dispatcher module 236 manages command tool-specific buffers on the surface and the corresponding toolbus master node controller 227 manages toolbus-specific buffers in the DTC 226. In Layer 574, cable telemetry manages the delivery of the commands over the physical medium of the cable 114.

A plurality of buffer control loops may be maintained across these three layers. In Loop 590, buffer control is established for the cable telemetry downlink layer between DTC 226 and surface acquisition front-end unit 119 so that the superpacket buffering space 586 in DTC 226 does not overflow. The DTM 220 may accomplish various tasks. In the presence of data, the DTM 220 maintains an average downlink data rate as needed based on the physical layer timing. The DTM 220 may stop generating superpackets if there is no data to send.

In case of transmission errors, the DTM 220 may re-transmit downlink superpackets. In case the DTC 226 signals "Superpacket Buffer Not Available", the DTM 220 may stop downlink superpacket transmission until the downhole buffer becomes available. The DTM 220 may also empty the superpacket buffer 586 if the telemetry link fails. As part of Loop 590, the DTC 226 may accomplish various tasks. The DTC 226 may detect a superpacket error and negatively (to the DTM 220) acknowledge bad packets.

The DTC 226 may maintain the superpacket buffer 586. In case the superpacket buffer 586 becomes full, the DTC 226 may send a "Superpacket Buffer Not Available" status to the DTM 220, as well as send a "Superpacket Buffer Available" to the DTM 220 when the condition changes. The DTC 226 may empty the superpacket buffer 586 if the telemetry link fails, or may do so on command from the DTM 220. The DTC 226 may periodically report the tool node buffer (588, 588', etc.) status to the surface for record-keeping purposes.

In Loop 591, buffer control is established for the cable telemetry downlink layer between the surface acquisition front-end unit 119 and surface computer data dispatcher module 236. The surface acquisition front-end unit 119 may accomplish various tasks. The surface acquisition front-end unit 119 may maintain a buffer 582 of downlink commands. Data from the buffer 582 may be used to generate downlink superpackets 584, thereby decoupling the sending of the data from surface computer 234 from the downlink superpacket generation.

The surface acquisition front-end unit 119 may issue "Buffer Not Available" result to surface computer data dispatcher module 236 when the buffer 582 reaches a threshold value. The surface acquisition front-end unit 119 may issue "Buffer Available" result to surface computer data dispatcher module 236 when the condition changes. The surface acquisition front-end unit 119 may empty the buffer 582 if the telemetry link fails.

The surface computer data dispatcher module 236 may accomplish two tasks in Loop 591 of flow control. The surface computer data dispatcher module 236 may deliver downlink data to surface acquisition front end 119 in response to a message of "Buffer Available." The surface computer data dispatcher module 236 may stop delivery in response to a message of "Buffer Not Available."

In Loop 592, buffer control is established for the cable telemetry downlink layer between the buffers at the master node controller 227 (i.e., a buffer specific to each tool) and the surface computer data dispatcher module 236 (also tool-node specific to each tool). The master node controller 227 may accomplish various tasks. The master node controller 227 may maintain a separate buffer (588, 588', etc.) for each toolstring interface package (i.e., IP, EIP or EIP 2.0) in the toolstring 116. The master node controller 227 may issue an "IP XX Buffer Not Available" to surface computer data dispatcher module 236 when the buffer (588, 588', etc.) for a particular IP, EIP or EIP 2.0 reaches a certain threshold percentage of its maximum value. For example, in an embodiment, a threshold value can be configurable from the surface according to the system selection based on the latency, or round trip time, differences. The master node controller 227 may issue an "IP XX Buffer Available" to surface computer data dispatcher module 236 when the buffer for that IP, EIP or EIP 2.0 goes below the threshold value. The master node controller 227 may empty buffers if the telemetry link fails, or on command from the surface computer 234. The master node controller 227 may periodically report the tool node buffer (588, 588', etc.) status to the surface for record-keeping purposes.

The surface computer data dispatcher module 236 may accomplish various tasks related to Loop 592. The surface computer data dispatcher module 236 may maintain a separate buffer for each IP, EIP or EIP 2.0 in the toolstring 116, which may be implemented at any size or in any manner. The surface computer data dispatcher module 236 may allow an application for tool XX to write into the buffer (576, 576', etc. and 580) if DTC 226 has sent a message "Downlink IP XX Buffer Available," and conversely, may not allow the application to write if the buffer (576, 576', etc. and 580) is not available. The surface computer data dispatcher module 236 may dispatch commands from each buffer in such a way as to enable each tool to have the ability to send its commands.

In Loop 593, buffer control is established for the cable telemetry downlink layer between the master node controller 227 and downhole tools 230, 230', etc. The master node controller 227 may maintain a separate buffer (588, 588', etc.) for each IP, EIP or EIP 2.0 in the toolstring 116. The master node controller 227 may send a command to an IP, EIP or EIP 2.0 when the tool's node buffer controller is ready to accept the next command. The master node controller 227 may send the tool commands to each downhole tool 230, 230', etc. as quickly as possible. The IP status word feedback from the tools 230, 230', etc. (the "acknowledgement", "downlink buffer overflow" and "downlink buffer full" are represented each by a single bit within the IP status word in packet header) may be used when dealing with IP/EIP slave nodes and similarly send tool commands to an EIP 2.0 tool as fast as possible given the EIP 2.0 status feedback. The master node controller 227 may buffer a command in a buffer 586 until the tool is ready to accept the command. The tool node controllers 233, 233', etc. (FIG. 2) of downhole tools 230, 230', etc. may receive and check data, as well as send status information to the master node controller 227 to allow the master node controller 227 to regulate the flow.

Toolstring Polling and Training Explanation

Enhanced Data Telemetry System 2.0 (EDTS 2.0) may be built in uphole and downhole modems of the cable telemetry system (e.g., 200 of FIG. 2). The EDTS 2.0 may use a multicarrier modulation technology called Discrete Multitone (DMT). Details on the DMT line signal technology are specified in U.S. Pat. No. 7,787,525. The EDTS 2.0 system may provide a guarantee of delivery of uplink data to the application or downlink commands to the tools 230, 230', etc.

The uplink data rate in EDTS 2.0 cable telemetry determined by the achievable data rate of the cable telemetry as the data rate available on the toolbus 228 and in the surface hardware, may exceed the data rate achievable on cable telemetry.

The EDTS 2.0 may support guaranteed data delivery on both T5 and T7 modes of the cable independently of each other (i.e. implement the re-transmission of data in case of error for each mode separately). Since the delivery of the data via the modems is guaranteed (subject to memory constraints), the latency of the data may not be guaranteed, given that the cable may have electrical noise. To avoid data overflow, EDTS 2.0 may determine toolstring data rate requirements and telemetry type configuration, perform a cable telemetry training phase to determine uplink cable telemetry rate, and, if the required data rate cannot be reached, the cable telemetry link may not be established and the user will be advised by MAXWELL™ to reduce the data rate requirement (such as logging speed, selected mode of operation of the tools 230, 230', etc.).

By iteration on the data rate requirement, the toolbus 228 access times for different tools 230, 230', etc. may be determined based on an achieved uplink cable telemetry rate and the needs of the downhole tools 230, 230', etc., given the logging speed and selected mode of operation. Once the uplink transmission has started, the data may experience random latencies depending on the noise and properties of the communication channels.

Many downhole tools 230, 230', etc. accept commands on each toolbus 228 frame (62.5 Hz). Some downhole tools 230, 230', etc. (such as PEX) may be designed for operation at, for example, about 15 Hz. Even the Fast Tool Bus/Enhanced Fast Tool Bus (FTB/EFTB) version of these tools 230, 230', etc., may still be restricted to receiving commands less than about 15 Hz. Thus, a 15 Hz eWAFE™ architecture may work. However, the system may have to run at the downlink command speed appropriate for the slowest tool, which may be hardly an optimal design for the whole system. For example, advanced tools 230, 230', etc. (such as MSIP) may be penalized whether or not an FTB-style tool is present in the toolstring 116.

A system of the present disclosure may correct these issues by creating a handshake mechanism (i.e., confirming receipt messaging) between the toolbus master and the tool slave node to ensure that the commands are acknowledged and the slave buffer does not overflow. Issues may also be addressed by using a buffering mechanism on the toolbus master to store commands for each slave node separately to facilitate sending of the command to the slave node when the slave node is ready to accept the next command.

The present disclosure may provide a handshaking mechanism between the downhole modem (interfaced with the toolbus master) and the surface modem (e.g., eWAFE™) intended to regulate the downlink cable telemetry flow. The handshake may be used so that the downhole modem does not overflow.

A handshaking mechanism between the surface modem (e.g., eWAFE™) and a suitable framework (e.g., MAXWELL™) may be used to regulate the command flow so that the downlink cable telemetry does not overflow. A handshaking mechanism between the framework (e.g., MAXWELL™) and relevant applications (e.g., MAXWELL™ applications) may be used to regulate the command generation so that the applications stop generating commands if the other buffers (e.g., eWAFE™ or toolbus master) are not available. A buffering mechanism in the framework (e.g., MAXWELL™) may be used to manage commands for each slave node separately. A handshaking mechanism between the toolbus master buffering mechanism and the framework (e.g., MAXWELL™) buffering mechanism may be used to assure that the toolbus master buffering does not overflow.

The uplink may be used to transmit data gathered in a downhole tool to the surface using the telemetry system. This transmission may occur if the telemetry system has been initialized and/or after toolstring data rate requirements and telemetry type configuration, toolstring power-up, cable telemetry training phase are established.

Toolstring data rate requirements and telemetry type configuration phase is a phase in which the framework (e.g., MAXWELL™) may determine the required data rate by polling individual requirements of tool-specific applications. The initialization phase may be used to determine the telemetry requirements on the surface system. Requirements may include, for example, that the framework (e.g., MAXWELL™) collect the required data rate from each tool application in toolstring 116. The sizes of messages, packets, superpackets and cable link packets, as well as their frequency, may be specified in field engineer documentation. The framework (e.g., MAXWELL™) may determine the telemetry type based on the selected telemetry cartridge. This information may be given to, e.g., eWAFE™ FEPC so that eWAFE™ FEPC can boot and initialize the eWAFE™ TIM for a selected telemetry service.

Figure 5:
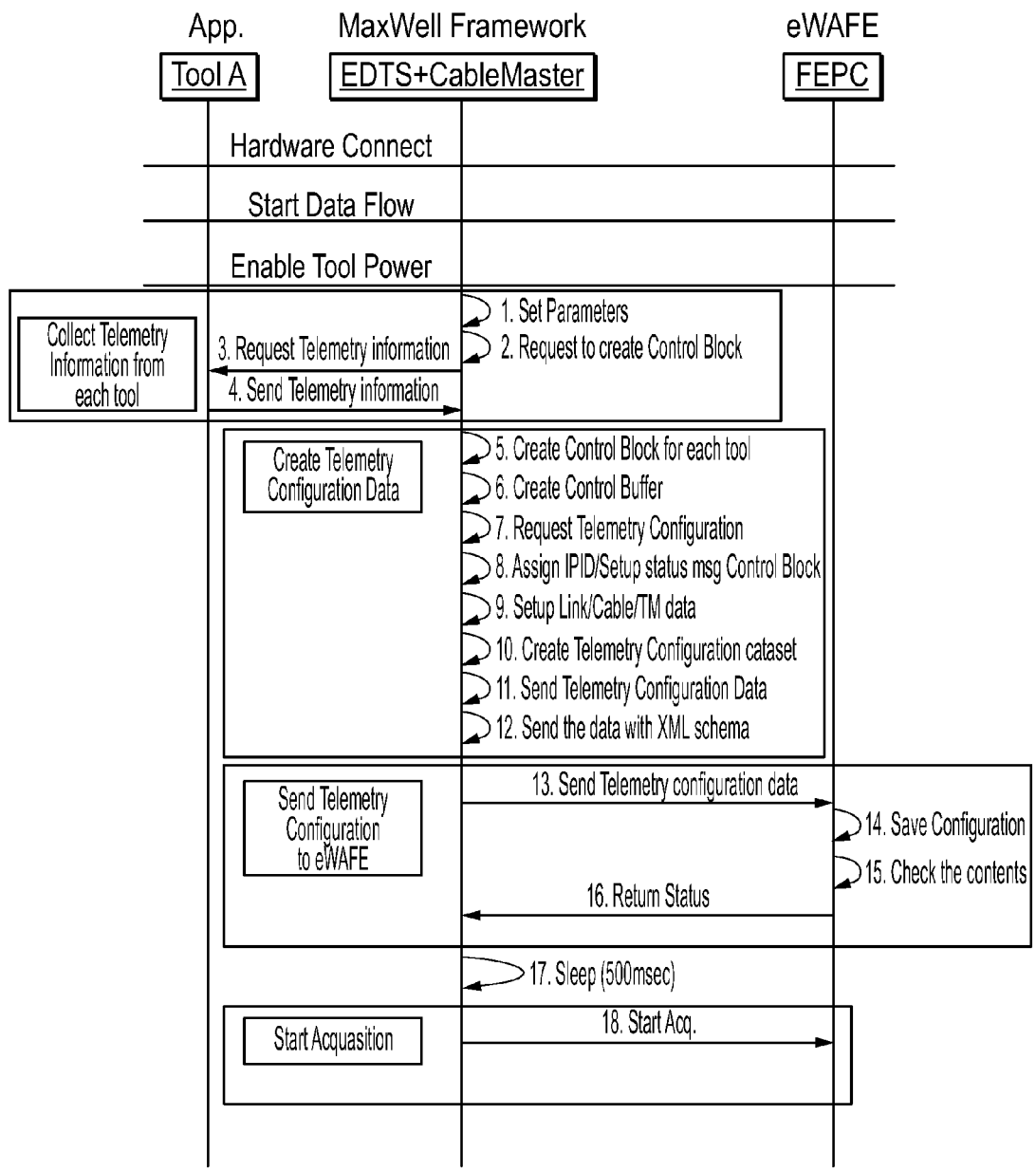
FIGS. 5 and 6 are schematic diagrams illustrating a telemetry configuration phase in accordance with the present disclosure.
Figure 6:
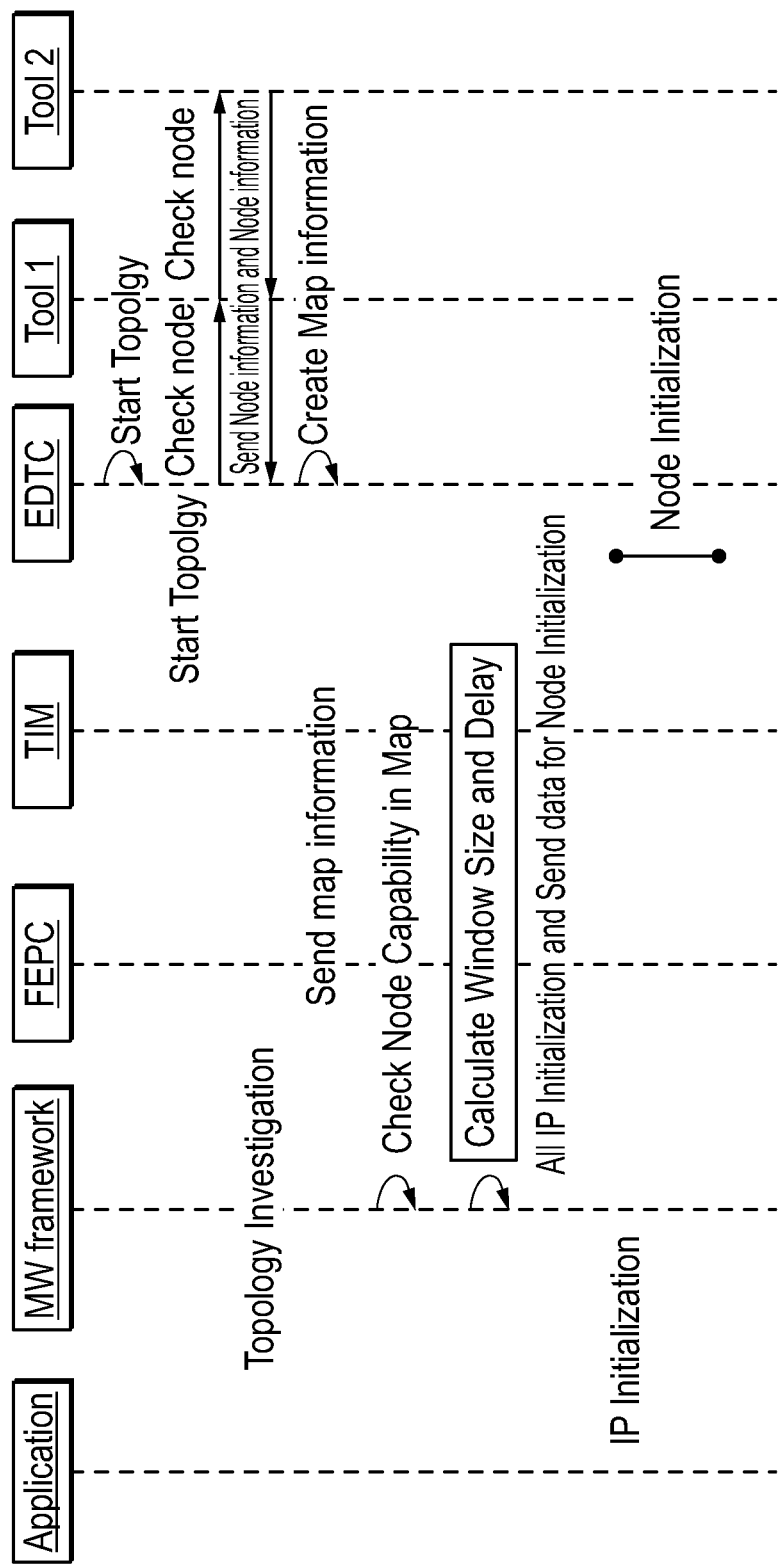

FIGS. 5 and 6 show the process of the telemetry configuration phase. The tasks may be performed using, for example, MAXWELL™ applications (Tool A), MAXWELL™ framework (EDTS+CableMaster) and eWAFE™ (FEPC). The components of these systems involved in the functional task 1-18 of FIG. 5 are shown. The process involves collecting telemetry information from each tool, creating telemetry configuration data, sending telemetry configuration to eWAFE™, and starting acquisition.

At the top of the workflow detailed in FIG. 5, a tool specific Application for Tool A is shown, as well as MAXWELL™ framework for EDTS and CableMaster and the eWAFE™ FEPC. The hardware is connected, data flow starts, and tool power for Tool A is enabled, and the method begins.

At 1, the MAXWELL™ framework sets parameters internal to EDTS and CableMaster. At 2, the MAXWELL™ framework generates a request to create a control block. In an embodiment, a block may be defined as a grouping of data storage registers.

At 3, the MAXWELL™ framework requests telemetry information (as described above) relating to Tool A from the tool-specific Application for Tool A. The tool-specific Application for Tool A responds at 4, sending the telemetry information relating to Tool A. In an embodiment, 4 may include, for example, retrieving stored telemetry information about Tool A. Steps 1-4 may be referred to as collecting telemetry information from each tool.

At 5, the MAXWELL™ framework creates a control block for each tool. The control block created at 5 may be based on the requested control block at 2. At 6, the MAXWELL™ framework creates a control buffer. In an embodiment, the control block information can be stored in the control buffer. At 7, the MAXWELL™ framework requests telemetry configuration. At 8, the MAXWELL™ framework assigns an interface package identifier (IPID) and sets up status message control block. At 9, the MAXWELL™ framework sets up the telemetry link, cable, and telemetry data. At 10, the MAXWELL™ framework creates a telemetry configuration dataset. At 11, the MAXWELL™ framework sends the telemetry configuration dataset to its output register. At 12, the MAXWELL™ framework sends the XML schema along with the telemetry configuration dataset to its output register. Steps 5-12 may be referred to as creating the telemetry configuration data.

At 13, the MAXWELL™ framework sends the telemetry configuration data to the eWAFE™ FEPC. At 14, the eWAFE™ FEPC saves the telemetry configuration data, and at 15, the eWAFE™ FEPC checks the contents of the telemetry configuration data. At 16, the eWAFE™ FEPC returns a status to the MAXWELL™ framework. Steps 13-16 may be referred to as sending the telemetry configuration to eWAFE™.

At 17, the MAXWELL™ framework enters a period of sleep, for example, 500 ms. At 18, the MAXWELL™ framework sends a command to the eWAFE™ FEPC to start the acquisition by Tool A.

As shown in FIG. 6, a topology investigation is performed across an application, MAXWELL™ (MW) framework, FEPC, TIM, EDTC and Tools 1 and 2. Topology investigation begins by checking nodes and creating a map, and continues by sending the map information, checking node capability, calculating window size and delay, and performing IP and node initialization.

The arrows show the flow of information across different components. If an arrow does not stop at a vertical line of a particular component, the particular component does not change the information or act on the information. A loopback arrow means that an action is taking place at that particular component.

At the top of the workflow detailed in FIG. 6, a tool specific Application is shown, as well as MAXWELL™ framework, eWAFE™ FEPC, TIM as described above, EDTC, and a tool string including Tool 1 and Tool 2. The method is described proceeding from the top of the chart down to the bottom. According to an embodiment, a topology pool may start at the EDTC. The EDTC sends a message to check node to Tool 1 and Tool 2. Tool 1 and Tool 2 send node information back to EDTC. EDTC creates a topology map using the node information from Tool 1 and Tool 2.

The topology map information is sent by EDTC to the MAXWELL™ framework by way of the TIM and the eWAFE™ FEPC. At the MAXWELL™ framework, the node capability for each node in the map is checked. The MAXWELL™ framework calculates a window size and delay based on the node information in the topology map. The MAXWELL™ framework sends the IP initialization and data for node initialization to the EDTC, which in turn initializes each node.

Topology investigation, as described with respect to FIG. 6, is disclosed in more detail in related and commonly assigned application entitled "TOOLSTRING TOPOLOGY MAPPING IN CABLE TELEMETRY" (U.S. patent Application Ser. No. 13/705,139, filed on Dec. 4, 2012) filed concurrently herewith.

Toolstring 116 power-up may be initiated by user's command to, e.g. MAXWELL™. MAXWELL™ informs the power-up request to FEPC by sending "Start Acquisition". Field engineer then applies power using, e.g. eWAFE™ power panel. An estimated Head Voltage (HV) taken by cable trim is displayed on the power panel until telemetry link is established. Upon cartridge powered-up, telemetry training sequence starts and the estimated HV is replaced by the actual measured value reported by cartridge. If the toolstring 116 is powered up and the telemetry link goes down, the cartridge will continuously try to connect to the TIM on surface.

The cable telemetry training phase enables data reception from the tools 230, 230', etc., and enables sending commands to the tools 230, 230', etc. via the wireline cable. The cable telemetry guarantees the delivery of uplink data (and downlink data) from one modem to the other.

Figure 7:
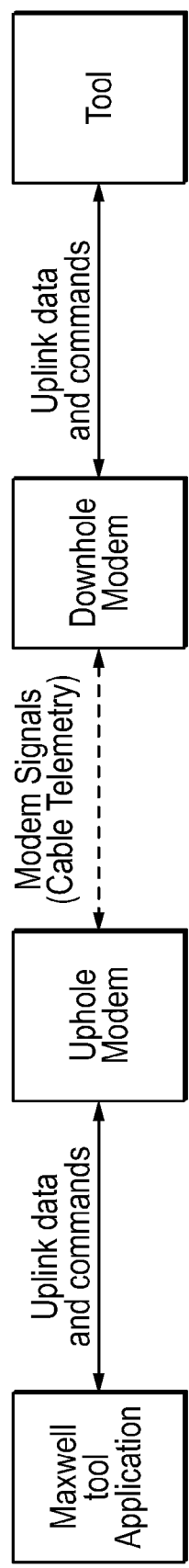
FIG. 7 is a block diagram illustrating verified data delivery in a cable telemetry system in accordance with an embodiment of the present disclosure.

The cable telemetry ensures that all of the data given to the modems reaches the other side of the cable (as shown in block diagram of FIG. 7). As shown in FIG. 7, uplink data passes between a tool application and an uphole modem; modem signals pass between an uphole modem and a downhole modem; and uplink data passes between the downhole modem and a tool. Cable telemetry guarantees the delivery between the uphole and downhole modems. The delivery between MAXWELL application to the tool is achieved by other EDTS 2.0 components.

The cable telemetry training phase may be used to establish a cable telemetry link and optimize the surface and downhole transceivers for a given cable and given downhole conditions. The physical equipment used in the cable telemetry may be the eWAFE™ Telemetry Interface Module (e.g., TIM 222, the uphole modem) and the EDTC-H (downhole modem). Cable training phase starts when EDTC-H cartridge is applied with sufficient power (e.g., when head voltage exceeds about 225 V; see section above on toolstring 116 powerup). This training phase may be conducted between uphole and downhole modems.

MAXWELL™ can provide required data rate needs for the configured toolstring 116 to the uphole modem, which may be compared with the estimated data rate calculated during the training. The output from the uphole modem after the modem training phase may be contained in performance/state messages. While the T5/T7 performance and state messages may provide a wealth of information, the 'PDSP Performance' message can provide a compact summary of the information necessary for MAXWELL™ system status control.

The cable telemetry training may be defined to have succeeded if the following occurs: physical layer training sequence completes successfully, for example, in the case of lost energy, bad pilot, etc.; and required uplink data rate (as requested by MAXWELL™) is achieved with acceptable SNR margin (e.g., greater than about 6 dB).

If the cable telemetry training phase succeeds, MAXWELL™ may receive 'Cable Telemetry Link Up' bit set in 'Cable Telemetry Link Status Word' (from PDSP performance message), a maximum achievable uplink data rate estimated during training (from PDSP performance message), a total current Up Link Data Rate (from PDSP performance message), and EDTC-H Head Voltage (from receiving EDTC-H IP#0 messages).

If the cable telemetry training phase does not succeed, MAXWELL™ may receive: 'Cable Telemetry Link Down' bit (one of many, depending on cause) set in 'Cable Telemetry Link Status Word' (from PDSP performance message), total achievable uplink data rate estimated during training (from PDSP performance message). The "Cable Telemetry Link Status Word' may be used by MAXWELL™ to help control the 'System Up'/'System Down' status. If the required data rate cannot be reached, the cable telemetry link will not be established and the user will be advised by MAXWELL™ to reduce the data rate requirement. For the purposes of this document, the successful training of cable telemetry will be termed as 'Cable Telemetry Link Established'.

Figure 8:
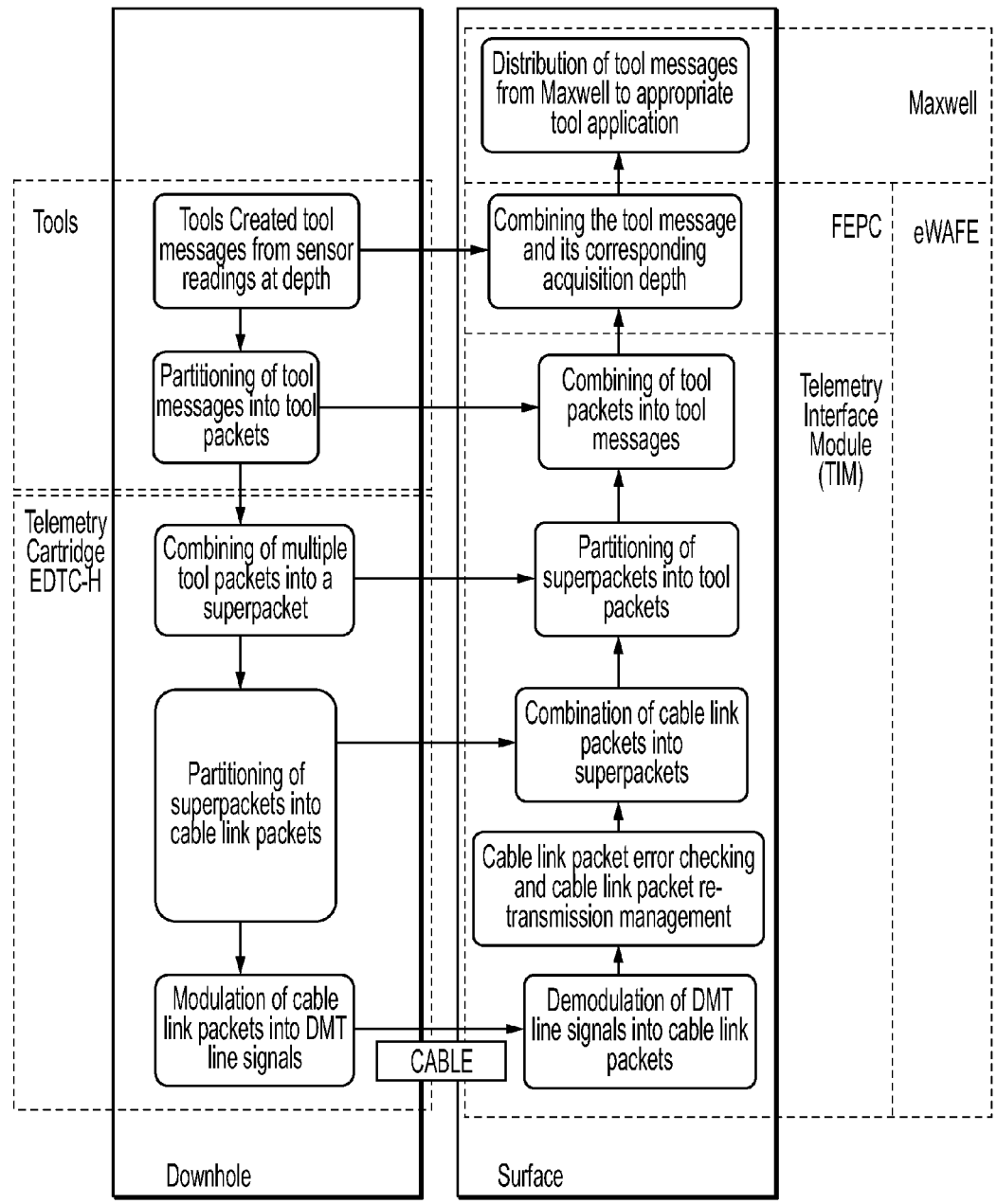
FIG. 8 is a schematic diagram illustrating various layers of data verified delivery protocol for ensuring delivery of uplink data in accordance with an embodiment of the present disclosure.

FIG. 8 shows layers of protocol that may be used to ensure that the uplink data is delivered from the downhole tool to the surface computer using a tool specific application, such as the MAXWELL™ application. The layers are depicted as MAXWELL, tools, telemetry cartridge, FEPC, eWAFE and TIM.

The layers extend over the downhhole and surface portions of the system, with a cable extending therebetween. The uplink data originates in the tools 230, 230', etc. For example, the tools create tool messages from sensor readings at depth. The tools then partition the tool messages into tool packets.

The uplink data is then transported via the toolbus 228 to the telemetry cartridge where it is prepared for transmission on the cable. For example, the EDTC-H can combine multiple tool packets into a superpacket. The EDTC-H can also partition the superpackets into cable link packets. The EDTC-H can also modulate the cable link packets into DMT line signals. Then the telemetry cartridge modem EDTC-H can communicate to its counterpart on the surface via the cable.

The DMT line signals are demodulated into cable link packets at the eWAFE™ TIM. The eWAFE™ TIM may also perform cable link packet error checking and cable link packet re-transmission management. The eWAFE™ TIM can also combine cable link packets into superpackets. The eWAFE™ TIM can also partition superpackets into tool packets, and further combine tool packets into tool messages.

The data continues to the eWAFE™ FEPC where it is joined with the depth at which the data was acquired (as determined by the eWAFE™ surface and hardware) and then the joined data proceeds to MAXWELL™ to be routed to the tool specific application that uses the data.

Figure 9:
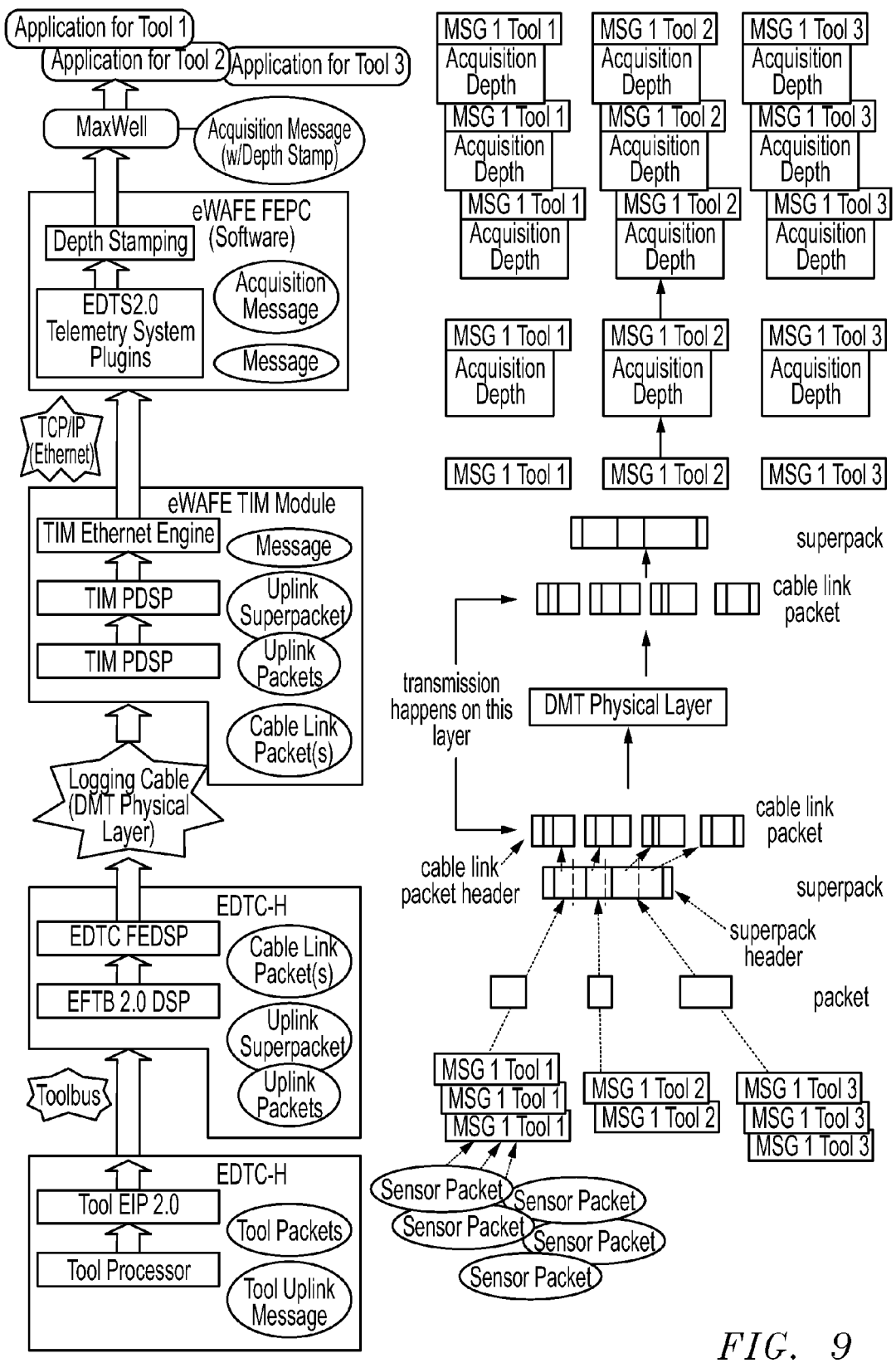
FIG. 9 is a schematic diagram illustrating an alternate view of the various layers of FIG. 8 in accordance with an embodiment of the present disclosure.

FIG. 9 shows the workflow of FIG. 8 in a different way where the protocol layers and actions are graphically explained. As shown in FIG. 9, the protocol layers show communication from the telemetry cartridge (EDTC-H), via logging cable through the TIM module and the FEPC module to MAXWELL™ and tools 1-3.

Starting at the bottom left of the chart, at a downhole tool a tool uplink message is converted into tool packets at the tool processor and passed to the tool EIP 2.0, and on to the toolbus. At the downhole modem, the data is converted into uplink packets, which can be converted into uplink superpackets, and to cable link packets. The cable link packets are passed to the EFTB 2.0 digital signal processor (DSP), and to the EDTC FEDSP before passing to the logging cable (which is the DMT physical layer).

At the surface eWAFE™ in the TIM, the cable link packets are converted back to uplink packets, and then the uplink packets are converted into uplink superpackets, and the uplink superpackets are converted into the data message. This occurs across the TIM PDSP and TIM Ethernet Engine, respectively. The data message is then passed via TCP/IP to the eWAFE™ FEPC, where the data message is converted into an acquisition message by the EDTS2.0 telemetry system plug-ins, and depth stamped by software. The acquisition message can then be passed to MAXWELL™, which distributes the messages according to the appropriate tool specific applications.

The modulating and demodulating steps at each component level are diagrammed on the right side of FIG. 9, parallel with the component that performs the conversion of the data.

In EDTS, uplink superpackets (containing tool data) are continuously generated at 62.5 Hz. These packets can be up to about 2048 words long. For EDTS 2.0, at least the same superpacket rate may be sustained so that the surface application does not see an appreciable increase in latency.

In a cable telemetry system operating at about 150 KHz, acknowledgements of received superpackets are carried using a maintenance channel. Where two out of 10-total downlink tones are used for this purpose, a maintenance data rate of 2.24 kbps per second may result. EDTC decodes the acknowledgement maintenance packet and searches for the superpacket sequence numbers stored in the superpacket buffer. Theoretically, up to about 63 superpacket sequence numbers can be carried with about 6-bits of acknowledgement. In an example EDTS implementation, EDTC may maintain about 40 old superpacket indices lists to be acknowledged.

If a superpacket has been acknowledged for a proper reception at surface, that particular superpacket may be discarded from the superpacket buffer and the slot address transferred to an available list. If a superpacket is either not being acknowledged or stayed in the buffer for more than 200 DMT frames, that superpacket may be re-transmitted.

In the half-duplex EDTS 2.0, T5 and T7, DSPs simultaneously transmit uplink superpackets at the same data rate as EDTS over T5 and T7 cable modes, respectively. Each T5 and T7 DSPs superpacket buffer can have the same EDTS re-transmission scheme. However, for the half-duplex EDTS 2.0, a downlink frame occurs once in about 65.45 ms (e.g., about 15.28 Hz), or about 36 uplink frames and about 2 quiet periods and about 1 downlink frame.

To keep the same re-transmission scheme as the EDTS, the surface transmitter may have a doubled acknowledgement rate than the EDTS (e.g., about 4.48 kbps) to acknowledge previous uplink superpackets received from T5 and T7 EDTC front-end DSPs (for dual mode EDTS 2.0). Each downlink frame may carry at least about 294 bits as the maintenance data. In half-duplex EDTS 2.0, many tones can be allocated for maintenance channel, compared to 2 fixed tones used in the EDTS. For example, this amount of maintenance data can be carried using about 74 tones out of about 255 available tones with about 4 bits per tone. For wideband half-duplex EDTS 2.0 (e.g., about 200 KHz to about 250 KHz), requirements can be met as the physical-layer frame rate increases while the superpacket rate remains constant.

The downlink may be used for surface to tool node command transmission. The downlink enables communication between the MAXWELL™ tool applications and the tools 230, 230', etc. themselves where the applications use downlink commands to control the tools 230, 230', etc. and download measurement coefficients or firmware to their specific tool.

In the EDTS system (150 KHz bandwidth), the downlink data protocol may be layered in EDTS 2.0. The downlink data channel data rate may be about 8.96 kbps. Downlink superpackets are generated at a rate less than about 15 Hz. These superpackets contain tool commands that are received from the surface application software (e.g., MAXWELL™). There may be a coupling between the physical layer transmission and reception of downlink superpackets and their transmission on the tool bus.

The commands in the superpacket may be put on the tool bus on the next tool bus frame. If there are no tool commands waiting to be transmitted on the surface, then no downlink superpacket is generated. Thus, the half-duplex downlink data rate may be no less than about 8.96 kbps and the downlink rate may be no slower than about 15 Hz for about 150 KHz bandwidth. For higher bandwidths (e.g., about 200 KHz to about 250 KHz), higher downlink data rates may be supported, but not required, as the increased downlink data rates may not be used by MAXWELL™.

Figure 10:
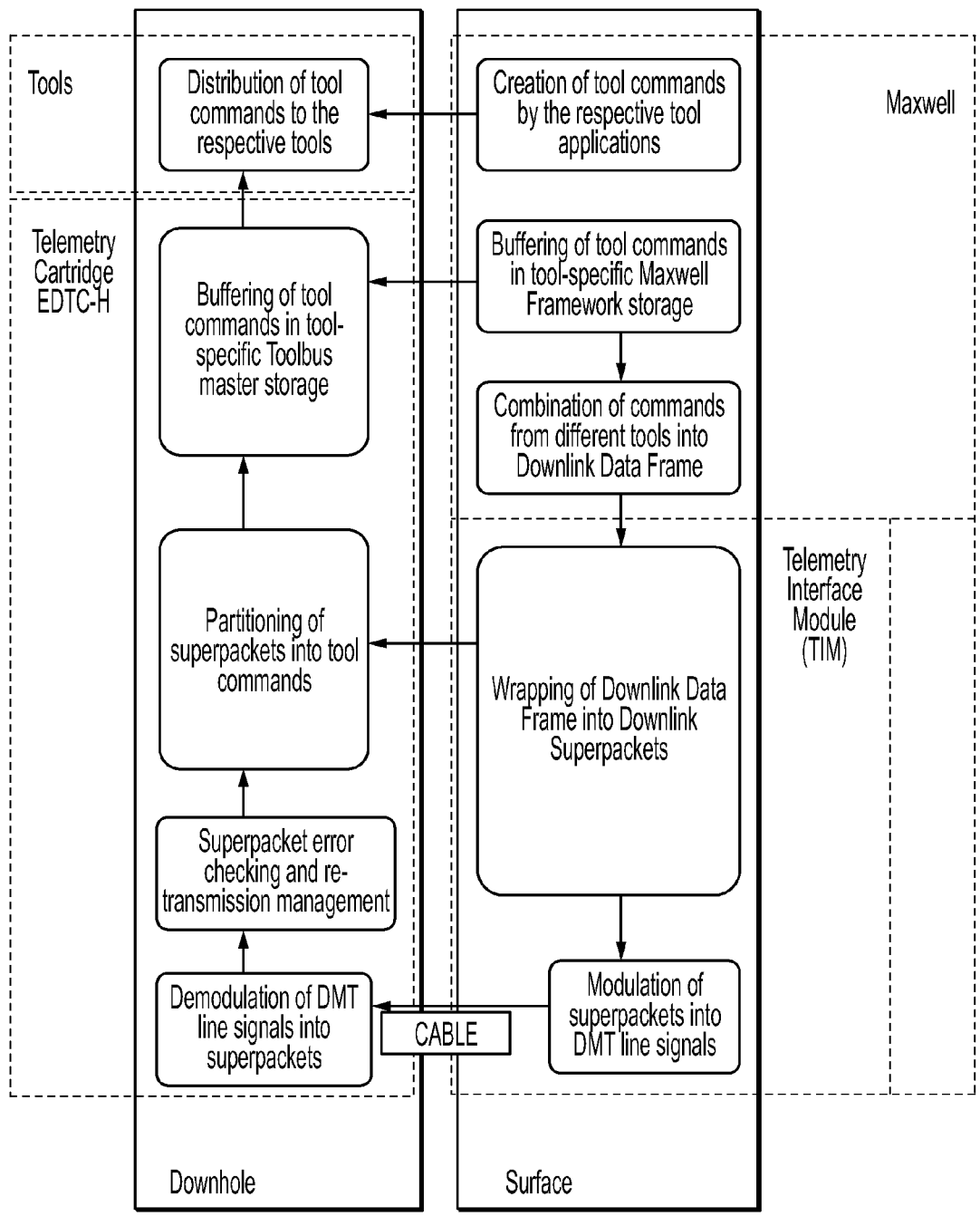
FIG. 10 is a schematic diagram illustrating an example flow of a command for communication in a cable telemetry system in accordance with an embodiment of the present disclosure.

The flow of a command from MAXWELL™ to the tool in EDTS 2.0 is shown in FIG. 10. FIG. 10 has multiple layers, e.g., MAXWELL and TIM at the surface, and telemetry cartridge and tools downhole. The surface and downhole portions are linked by a cable. Starting at the top right of FIG. 10, MAXWELL™ creates tool commands based on requests from respective tool-specific applications. The commands are created by MAXWELL™ applications and consumed by the tools 230, 230', etc.

MAXWELL™ buffers the tool commands into tool-specific MAXWELL™ storage. MAXWELL™ combines commands from the various tools into a transmittable downlink data frame.

The downlink data is transported using superpackets, which are collections of commands. At the TIM of eWAFE™, the downlink data frames are wrapped into downlink superpackets, and modulated into DMT line signals. The DMT line signals are transmitted across the cable.

At the downhole side, the EDTC-H demodulates the DMT line signals into superpackets, and performs error checking and re-transmission management. The EDTC-H may also partition the superpackets into tool commands, and buffer tool commands into tool-specific toolbus master storage, as described above. The tool commands are distributed to the respective tools from the tool-specific toolbus master storage upon availability of command buffer space at each respective tool.

The delivery of the superpackets is guaranteed by the cable telemetry because of error checking and re-transmission of superpackets in error. The commands are stored in the toolbus master waiting for delivery to relevant tool when the tool is ready to receive the command. The tool node specific command flow is controlled by the handshake between MAXWELL™ and telemetry cartridge according to the tool's command consumption.

Figure 11:
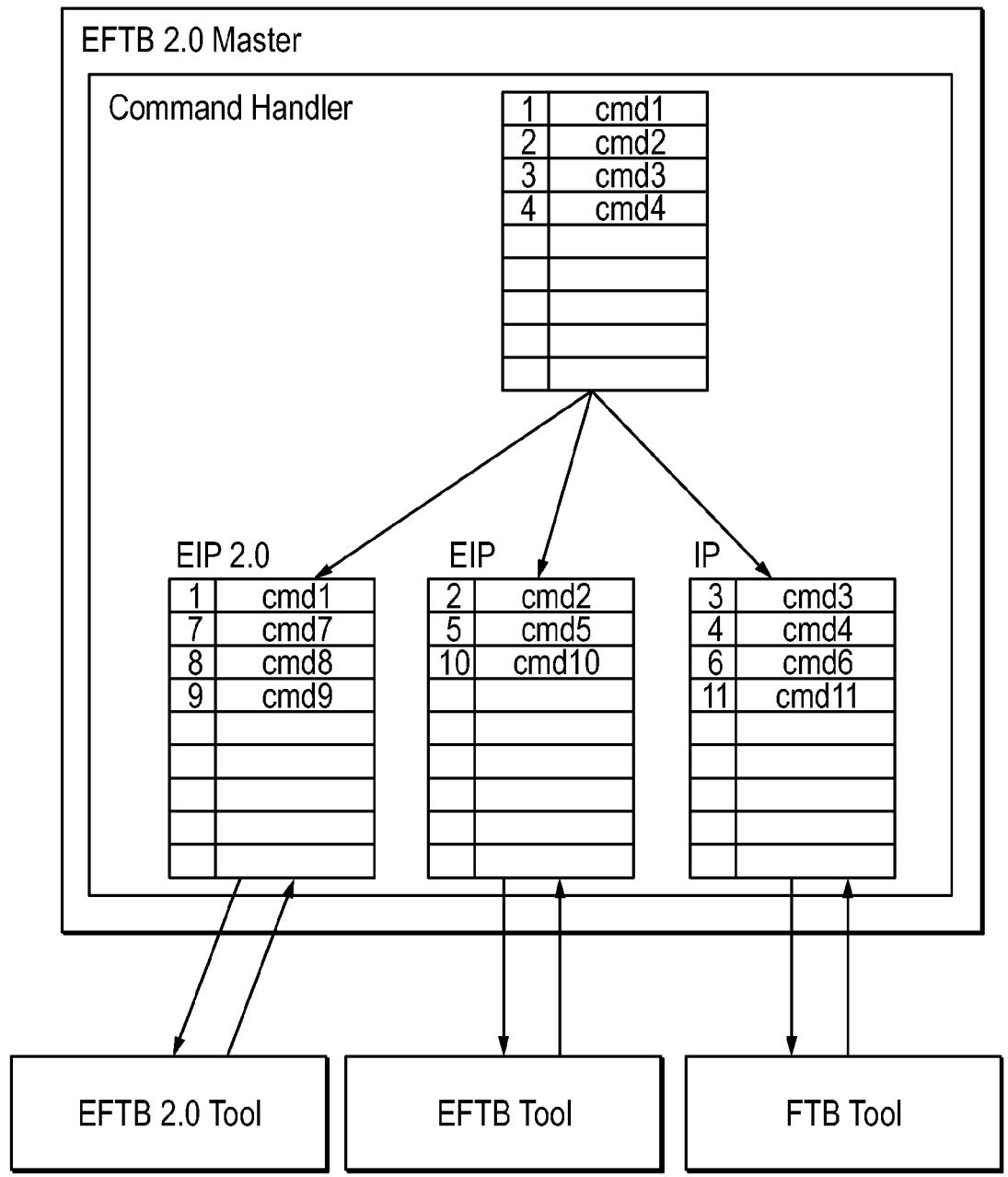
FIG. 11 is a block diagram illustrating buffer(s) maintained for nodes in a toolstring in accordance with an embodiment of the present disclosure.

A buffer may be maintained for each node in the toolstring 116 by the tool bus master, as shown in FIG. 11. As shown in FIG. 11, EFTB 2.0 master is layered with a command handler and coupled to EFTB 2.0 tool, EFTB tool and FTB tool.

The EFTB 2.0 Master includes a command handler. The command handler includes a main buffer (top center), and an EIP 2.0 tool specific buffer, and EIP tool-specific buffer, and an IP tool-specific buffer, though in an embodiment, there could be more than one of each type of tool in the toolstring, and the command handler would include a tool-specific buffer for each of said tools. The EIP 2.0 buffer stores commands directed to an EFTB 2.0 tool. The EIP buffer stores commands directed to an EFTB tool. The IP buffer stores commands for the FTB tool. The command handler includes logic to examine incoming commands to determine which tool is the destination for the command, and direct each command to the appropriate buffer corresponding to the destination tool.

In the example shown in FIG. 11, commands arrive at the main buffer chronologically, command 1 (CMD1) arriving in the top register, command 2 (CMD2) arriving in the second register, command 3 (CMD3) arriving in the third register, and so on. The arrows show the commands being transferred to the command buffer associated with each tool when the command handler determines which of the tools (EFTB 2.0 tool, EFTB tool, or FTB tool) the command is destined for. Upon examination, command 1 (CMD1) is directed to the EFTB 2.0 tool, and as such, as transferred to the EIP 2.0 tool buffer in the master controller. Command 2 (CMD2) is directed to the EFTB tool, and so is transferred to the EIP tool buffer in the master controller. Command 3 (CMD3) is directed to the FTB tool, and so is transferred to the IP tool buffer in the master controller. Likewise, commands 7, 8, and 9 (CMD7, CMD8, and CMD9) are directed to the EFTB 2.0 Tool, and are shown as transferred to the EIP 2.0 tool buffer in the master controller, while commands 5 and 10 (CMD5 and CMD10) are directed to the EFTB tool and are shown as transferred to the EIP tool buffer in the master controller.

Commands 4, 6, and 11 (CMD4, CMD6, and CMD11) are directed to the FTB tool, and are shown as transferred to the IP tool buffer in the master controller.

Figure 12:
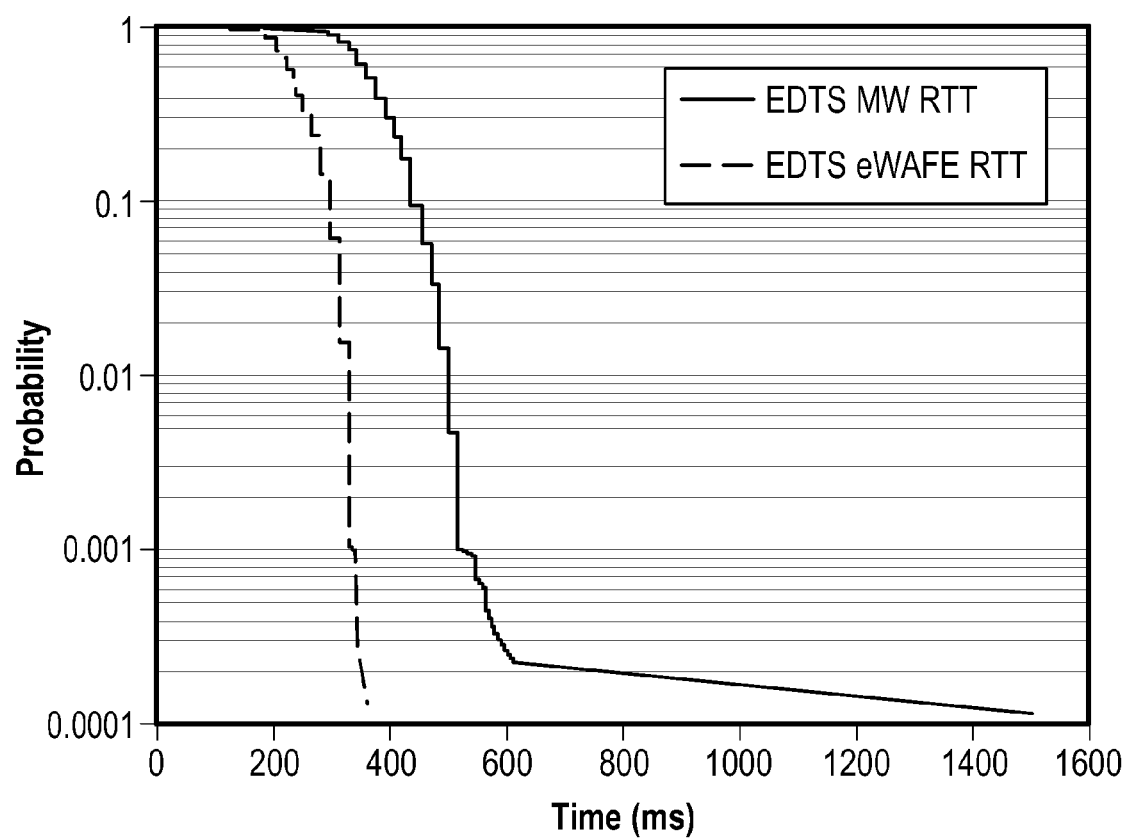
FIG. 12 is a plot illustrating round trip time in accordance with an embodiment of the present disclosure.

The round trip time (RTT) to MAXWELL™ was experimentally determined per FIG. 12. FIG. 12 depicts probability (y-axis) versus time (x-axis) for a round trip time (RTT) from a tool to MAXWELL™ (in the solid curve) and eWAFE™ (in the dashed curve) as experimentally determined. The difference between the two curves shows that some delay in data transfer may be introduced by software in transferring from eWAFE™ to MAXWELL™.

In IP buffer management in tool bus master, the EDTC-H has 32×1024×16 bits (words=16 bits) available for $Q_{ip}$ storage. The maximum number of tools 230, 230', etc. that can be connected in EDTS 2.0 is 32. The available memory may be distributed evenly among the booted tools 230, 230', etc. according to the booted number of nodes through the topology investigation. The equation below sets the relationship between available memory and the number of booted nodes for EDTC-H:

$$\text{Available memory per node} = 32 \times 1024/N \qquad \text{Eq. (1)}$$

where N is the number of booted nodes, since 32 is the number of tools that can be connected to EDTC-H, and 1024 is the number of available words per node.

A "stop sending" request can be issued per node, when the memory per node reaches the configured threshold value. In an example embodiment, the number of total booted node is 32. Tool string embodiments in use can have less than 32 interface packages. Based on equation (1), the system can support up to 32 nodes and the memory per node is about 1024 words.

In an example, a threshold cap value may be set to cap the memory per node, in order to issue a "stop send" command. In one embodiment, the threshold cap value for the memory per node may be:

$$\text{Cap memory per node} = \text{words/ms} \times \text{time\_to\_overflow} \qquad \text{Eq (2)}$$

where time_to_overflow=0.5 sec (e.g., sufficient for more than 99.99% of latencies) and the words/ms may be capped at 512 words (which would be a quarter of the available memory).

If the tool has an IP or an EIP node, up to about 1 command can be sent to the slave about every 16 ms (corresponding to 62.5 Hz half-duplex transmission on the toolbus 228). This rate allows the toolbus master to use the acknowledgment protocol present in IP and EIP slaves (but not used in EDTS) where the "acknowledgement", "downlink buffer overflow" and "downlink buffer full" are represented each by a single bit within the IP status word in packet header.

Although a few example embodiments have been described in detail above, those skilled in the art will readily appreciate that many modifications are possible in the example embodiments without materially departing from this disclosure. Accordingly, such modifications are intended to be included within the scope of this disclosure as defined in the following claims. In the claims, means-plus-function clauses are intended to cover the structures described herein as performing the recited function and not simply structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. A system for toolstring communication in cable telemetry, comprising:
- a surface modem;
- a downhole toolstring comprising one or more downhole tools;
- a downhole modem operatively coupled to the downhole toolstring;
- a cable operatively coupling the surface modem and the downhole modem;
- a surface data routing module that, upon the system being powered, performs a pre-transmission poll of a data rate requirement for the downhole toolstring and a telemetry type for the downhole modem;
- a surface computer that calculates an actual data rate for the downhole toolstring during a training phase and compares the actual data rate for the downhole toolstring to the data rate requirement resulting from the pre-transmission poll;
- when the actual data rate for the downhole toolstring exceeds or matches the data rate requirement resulting from the pre-transmission poll, the surface computer outputs a link up message; and
- when the data rate requirement resulting from the pre-transmission poll exceeds the actual data rate for the downhole toolstring, the surface computer outputs a link down message.

2. The system according to claim 1, wherein the surface data routing module performs the pre-transmission poll by obtaining telemetry information associated with each of the one or more downhole tools.

3. The system according to claim 2, wherein the telemetry information comprises one or more of: packet size, message size, superpacket size, cable link packet size, frequency of packet, frequency of message, frequency of superpacket, frequency of cable link packet, link information, cable information, control block information, adapter information, tool module information, cartridge information, interface package information, physical node identification information, and combinations thereof.

4. The system according to claim 1, wherein the surface computer further calculates an estimated achievable uplink data rate during the training phase and outputs the estimated achievable uplink data rate.

5. A method for toolstring communication in cable telemetry, comprising:
- positioning a cable telemetry system in a wellbore, the cable telemetry system comprising:
  - a surface modem;
  - a downhole toolstring comprising one or more downhole tools;
  - a downhole modem operatively coupled to the downhole toolstring;
  - a cable operatively coupling the surface modem and the downhole modem; and
  - a surface data routing module that polls and trains the cable telemetry system;
- performing a pre-transmission poll of a data rate requirement for the downhole toolstring and a telemetry type for the downhole modem;
- applying a training phase to establish a transmission link between the surface modem and the downhole modem and further comprising:
- comparing an actual data rate for the downhole toolstring to the data rate requirement resulting from the pre-transmission poll; and
- when the actual data rate for the downhole toolstring exceeds or matches the data rate requirement resulting from the pre-transmission poll, generating a link up message; and
- when the data rate requirement resulting from the pre-transmission poll exceeds the actual data rate for the downhole toolstring, generating a link down message;
- configuring data obtained by the downhole toolstring for an uplink via the transmission link; and
- transmitting the uplink via the transmission link.

6. The method according to claim 5, wherein said performing the pre-transmission poll further comprises obtaining telemetry information associated with each of the one or more downhole tools.

7. The method according to claim 6, wherein the telemetry information comprises one or more of: packet size, message size, superpacket size, cable link packet size, frequency of packet, frequency of message, frequency of superpacket, frequency of cable link packet, link information, cable information, control block information, adapter information, tool module information, cartridge information, interface package information, physical node identification information and combinations thereof.

8. The method according to claim 7, further comprising determining the telemetry type for the downhole modem based on an identifier of a modem type of the downhole modem.

9. The method according to claim 5, further comprising:
- estimating an achievable uplink data rate during the training phase; and
- outputting the achievable uplink data rate.

10. The method according to claim 5, further comprising: advising user to reduce the data rate requirement resulting from the pre-transmission poll when the link down message is generated.

* * * * *